(12) United States Patent
Rose et al.

(10) Patent No.: US 11,932,194 B2
(45) Date of Patent: Mar. 19, 2024

(54) AIRBAG INFLATOR WITH PRESSURE RELIEF AND INCREASED COMBUSTION EFFICIENCY

(71) Applicant: ARC TECHNOLOGY HOLDING LIMITED, Kowloon (HK)

(72) Inventors: James M. Rose, Knoxville, TN (US); Brian Thomas, Knoxville, TN (US); Brad Hight, Knoxville, TN (US); J. Scott DiGangi, Knoxville, TN (US); Kenneth J. Young, Knoxville, TN (US)

(73) Assignee: ARC TECHNOLOGY HOLDING LIMITED, Kowloon (HK)

( * ) Notice: Subject to any disclaimer, the term of this patent is extended or adjusted under 35 U.S.C. 154(b) by 348 days.

(21) Appl. No.: 17/118,847

(22) Filed: Dec. 11, 2020

(65) Prior Publication Data
US 2022/0185224 A1    Jun. 16, 2022

(51) Int. Cl.
*B60R 21/276*    (2006.01)
(52) U.S. Cl.
CPC ................... *B60R 21/276* (2013.01)
(58) Field of Classification Search
CPC .... B60R 21/276; B60R 21/272; B60R 21/264
See application file for complete search history.

(56) References Cited

U.S. PATENT DOCUMENTS 5,423,570 A * 6/1995 Kort ...................... B60R 21/272
280/736
5,516,147 A * 5/1996 Clark ..................... B60R 21/272
280/736
5,601,308 A    2/1997 Cuevas
(Continued)

FOREIGN PATENT DOCUMENTS

| CN | 109677353 |   | 4/2019 |             |
|----|-----------|---|--------|-------------|
| CN | 109677353 A | * | 4/2019 | ........... B60R 21/272 |
| CN | 111634252 |   | 9/2020 |             |

OTHER PUBLICATIONS

CN-109677353-A (machine translation) (Year: 2019).*
European Search Report dated Apr. 20, 2021 issued in European Patent Application No. 21159918.8, 9 pp.

*Primary Examiner* — Jason D Shanske
*Assistant Examiner* — Joselynn Y Sliteris
(74) *Attorney, Agent, or Firm* — NIXON & VANDERHYE P.C.

(57) ABSTRACT

An airbag inflator includes a lower pressure vessel supporting an initiator assembly, a booster can centrally mounted in the lower pressure vessel and secured to the initiator assembly, and an energetics canister secured over the booster can such that the energetics canister is positioned radially between the lower pressure vessel and the booster can. An energetics cover encloses a circumferential space between the booster can and the energetics canister. A flow diverter closes the booster can and includes inlet vent openings downstream of the energetics cover. An upper pressure vessel positioned over the flow diverter and engaging the lower pressure vessel includes an exit orifice sealed with a rupturable membrane. A manifold is secured over the upper pressure vessel. The inflator increases combustion efficiency and lowers gaseous effluents.

28 Claims, 8 Drawing Sheets

(56) References Cited

U.S. PATENT DOCUMENTS

| | | | |
|---|---|---|---|
| 5,634,661 A * | 6/1997 | Dahl | B60R 21/272 |
| | | | 280/741 |
| 5,750,922 A | 5/1998 | Seeger | |
| 5,765,866 A | 6/1998 | Canterberry et al. | |
| 5,829,784 A | 11/1998 | Brown et al. | |
| 5,831,207 A | 11/1998 | Seeger et al. | |
| 5,834,679 A | 11/1998 | Seeger | |
| 6,149,191 A | 11/2000 | Rink | |
| 6,464,254 B2 | 10/2002 | Chikaraishi et al. | |
| 6,540,257 B2 * | 4/2003 | Magoteaux | B60R 21/276 |
| | | | 280/739 |
| 6,752,421 B2 | 6/2004 | Khandhadia et al. | |
| 7,878,535 B2 | 2/2011 | Rose et al. | |
| 8,893,622 B2 | 11/2014 | Jackson et al. | |
| 9,669,795 B2 * | 6/2017 | Wang | B60R 21/013 |
| 9,676,366 B2 | 6/2017 | Hordos | |
| 10,118,584 B2 | 11/2018 | Hordos | |
| 10,677,575 B2 | 6/2020 | Keller | |
| 10,875,490 B2 * | 12/2020 | Norman, III | B60R 21/2644 |
| 10,940,826 B2 | 3/2021 | Choi | |
| 11,040,692 B2 * | 6/2021 | Lohmann | B60R 21/272 |
| 11,154,802 B2 * | 10/2021 | Hoffman | B01D 46/2403 |
| 2019/0322239 A1 | 10/2019 | Norman, III et al. | |

* cited by examiner

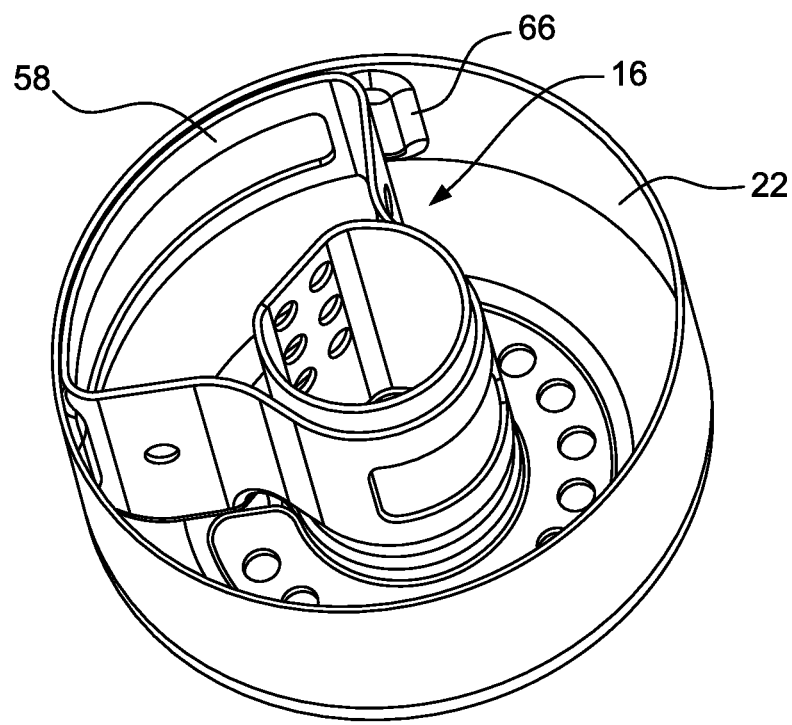
FIG. 13
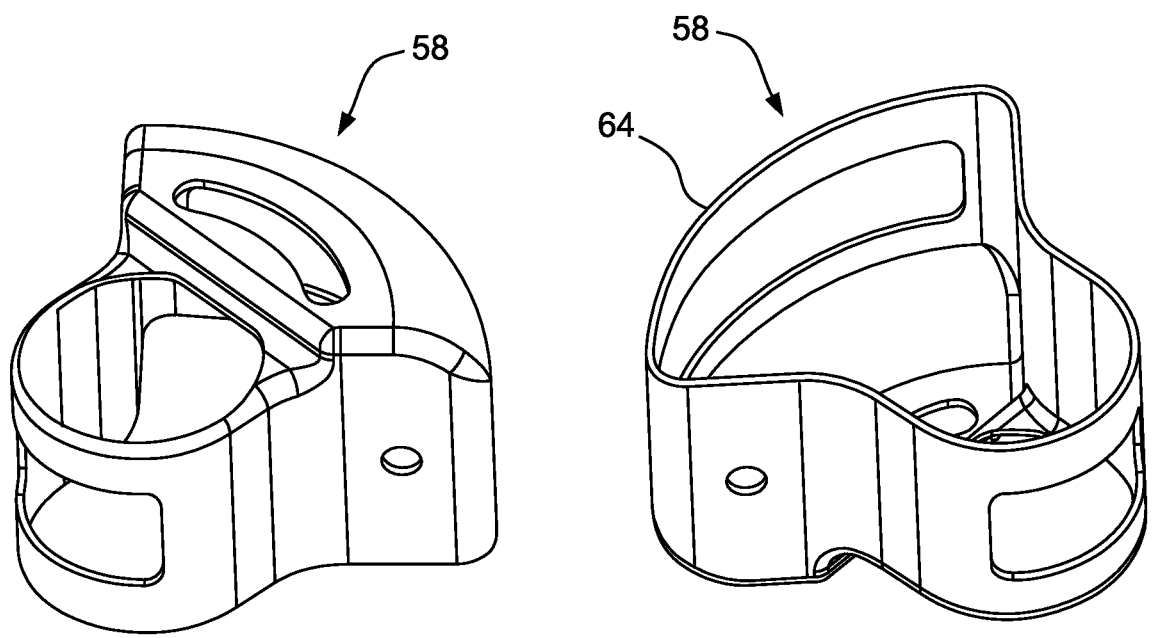
FIG. 14  FIG. 15

AIRBAG INFLATOR WITH PRESSURE RELIEF AND INCREASED COMBUSTION EFFICIENCY

CROSS-REFERENCES TO RELATED APPLICATIONS (NOT APPLICABLE)

STATEMENT REGARDING FEDERALLY SPONSORED RESEARCH OR DEVELOPMENT (NOT APPLICABLE)

BACKGROUND

The invention relates to an airbag inflator and, more particularly, to an inflator with improved combustion efficiency and reduced gaseous effluents (e.g., NO, and CO).

When an airbag initiator assembly is triggered, in some existing designs, a combustion event effects rapid deployment of the airbag cushion to protect occupants in a vehicle. The airbag cushion includes vents to the interior, and it is desirable to control the gaseous effluents as a product of the combustion event to limit vehicle occupant exposure to dangerous gases.

Some existing inflator assemblies utilize a center support structure that requires two simultaneous welds, which is problematic in respect of manufacturing and also increases the potential for weld particles to exit the inflator upon deployment.

Existing designs have also been configured to fragment during deployment as a consequence, in the event of excessive pressure increase within the inflator due to some failure or external condition or the like, these existing inflator designs can be potentially hazardous for vehicle occupants.

SUMMARY

It would be desirable to provide an airbag inflator that reduces gaseous effluents with efficient combustion while incorporating additional safety features in respect of venting and unintended increases in internal pressure and weld particles.

The airbag inflator of the described embodiments includes a pressure vessel with a bottom portion and a top portion. The top portion includes an exit orifice that is closed with a rupturable membrane. The device is filled with a gas mixture, thus operating as a hybrid inflator releasing a mixture of stored and generant combustion gas to achieve the desired module performance.

The inflator is provided with a booster can pressed onto a sleeved initiator that houses and vents combustion and stored gases via a series of holes. An energetics canister houses the main generant material into which the booster can vents with various holes. The canister creates a high-pressure sub-chamber. To control ignition of the main generant material wherein reducing the internal operating pressure of the inflator, the energetics canister may be further divided into multiple sub-chambers wherein the booster vents into one of the chambers. The multiple sub-chambers are connected to one another via control vents. A canister lid with vent holes encloses the energetics canister. A flow diverter is placed into the booster can to retain the energetics cover to the energetics canister and to further direct and control pressure and flow before exiting the top vessel via a control orifice. A manifold diverts the combustion gases into the airbag cushion/module.

The booster can, energetics canister, and lid are designed to allow the generant to operate at a higher internal pressure than the external volume between the outside of the canister/lid/flow diverter assembly, thereby increasing combustion efficiency leading to improved performance in terms of gaseous effluents and cushion/module performance.

In addition, the structure at elevated system internal pressure allows for a pressure relief mechanism through the bottom portion of the lower pressure vessel in the center area in the event of excess internal pressure without any rupture of the inflator during a deployment event. During the in-process production, a regulatory test is required that verifies compliance to stored gas pressure vessel shipping regulations. This test is called a hydroburst test in which the structure is filled with a liquid and taken at a lower pressurization rate than a live deployment. In this case, the inflator experiences a compliant vent of the pressure in the lower pressure vessel.

In an exemplary embodiment, an airbag inflator includes a lower pressure vessel supporting an initiator assembly, a booster can centrally mounted in the lower pressure vessel and secured to the initiator assembly, and an energetics canister secured over the booster can such that the energetics canister is positioned radially between the lower pressure vessel and the booster can. The energetics canister may contain smaller canisters or sub-chambers to control ignition of the generant in the main energetic canister. An energetics cover encloses a circumferential space between the booster can and the energetics canister. A flow diverter closes the booster can and includes inlet vent openings downstream of the energetics cover. An upper pressure vessel positioned over the flow diverter and engaging the lower pressure vessel includes an exit orifice sealed with a rupturable membrane. A manifold is secured over the upper pressure vessel.

The booster can may include directional vents such that ignition gas from the booster can is not uniformly distributed into the energetics canister. The ignition gas ignites the main generant contained in the energetics canister. In this context, the booster can may be cylindrical, and the directional vents may include orifices in one quadrant of the booster can. When the energetics canister contains smaller canisters or chambers, the ignition gas is directed into one of the smaller energetics canisters or chambers.

The energetics canister may be spaced from a floor of the lower pressure vessel, where the energetics canister may include outlet vent openings in a bottom wall through which main generant combustion gases exit the energetics canister into a space between the energetics canister and the lower and upper pressure vessels. The flow diverter may be disposed in the space between the energetics canister and the upper pressure vessel, where the main generant combustion and stored gases exiting the energetics canister pass through the inlet vent openings of the flow diverter. The manifold may include manifold vents whose function is to directionally control the gas filling the airbag cushion, where the main generant combustion gas and stored gas passing into the flow diverter flows through the upper pressure vessel via the exit orifice into the manifold and through the manifold vents.

The initiator assembly may be secured in the lower pressure vessel such that the initiator detaches from the initiator assembly upon an increase in internal pressure without a pressure vessel fragmentation event.

In some embodiments, the upper pressure vessel may be welded to the lower pressure vessel, and the booster can may be secured without a weld.

The inflator may also include a generant disposed in the energetics canister, where a relative position of the energetics canister effects a higher operating pressure in the circumferential space than an operating pressure in a space between the energetics canister and the upper and lower pressure vessels. The energetics canister may contain one or more sub-canisters to control ignition of the generant in the energetics canister assembly.

The inflator may be filled with an inert gas or gas mixture, e.g., Argon/Helium under pressure. The energetics cover may include vent holes. The vent holes in the energetics cover may not be uniformly positioned around the lid. The booster can may be cylindrical, and the energetics canister may be substantially cylindrical such that the circumferential space may be toroidal shaped. In this context, the inlet vent openings in the flow diverter may be positioned circumferentially around the flow diverter.

In another exemplary embodiment, an airbag inflator includes a lower pressure vessel supporting an initiator assembly, an upper pressure vessel engaging the lower pressure vessel and including an exit orifice sealed with a rupturable membrane, and an inert gas or gas mixture contained in the lower and upper pressure vessels. A first pressure zone containing a generant includes outlet vent openings through which combustion and stored gases exit. A second pressure zone functions at an operating pressure lower than an operating pressure of the first pressure zone. Ignition gas from the first pressure zone flows through the outlet vent openings into the second pressure zone. A flow diverter is disposed in the second pressure zone and includes inlet vent openings. The flow diverter is configured to direct the combustion and stored gases through the exit orifice. A manifold secured over the upper pressure vessel includes directional vents through which the combustion and stored gases from the exit orifice pass.

In yet another exemplary embodiment, an airbag inflator includes a lower pressure vessel supporting a hermetically sealed initiator assembly, and an upper pressure vessel engaging the lower pressure vessel. The upper pressure vessel includes an exit orifice sealed with a rupturable membrane. An inert stored gas mixture at pressures at least fifty times greater than atmospheric pressure is contained within the upper and lower pressure vessels. A booster can with directional vents confines outwards flow to an angular quadrant centrally mounted in the lower pressure vessel and secured to the initiator assembly. A main energetics canister is secured over the booster can such that the main energetics canister is positioned radially between the lower pressure vessel and the booster can, and an internal energetics canister located inside the main energetics canister is positioned between the main energetics canister and the booster can enclosing an angular region inside the main energetics canister. An energetics cover encloses a circumferential space between the booster can and the main energetics canister. A flow diverter closing the booster can includes inlet vent openings downstream of the energetics cover. A manifold is secured over the upper pressure vessel.

The main energetics canister may be spaced from a floor of the lower pressure vessel, where the main energetics canister may have outlet vent openings in a bottom wall through which combustion and stored gases exit the main energetics canister into a space between the main energetics canister and the lower pressure vessel. The internal canister may include outlet vent openings in a bottom wall through which combustion and stored gases exit the internal energetics canister into the space between the main energetics canister and the lower pressure vessel. The internal energetics canister may have outlet vents in walls separating the internal and main energetics canisters through which combustion and stored gases exit the internal energetics canister into the main energetics canister. The flow diverter may be disposed in a space between the energetics canister and the upper pressure vessel, where the combustion and stored gases exiting the energetics canister pass through the inlet vent openings of the flow diverter. The manifold may include directional vents, and the combustion and stored gases passing into the flow diverter may flow through the upper pressure vessel via the exit orifice into the manifold and through the directional vents. The initiator assembly may include an initiator, and the initiator assembly may be secured in the lower pressure vessel such that the initiator detaches from the initiator assembly upon an excessive increase in internal pressure. The internal pressure may be safely vented without an inflator fragmentation event.

BRIEF DESCRIPTION OF THE DRAWINGS

These and other aspects and advantages will be described in detail with reference to the accompanying drawings, in which:

FIGS. 11-15 show variations including an internal energetics canister within the main energetics canister.

DETAILED DESCRIPTION

Figure 9:
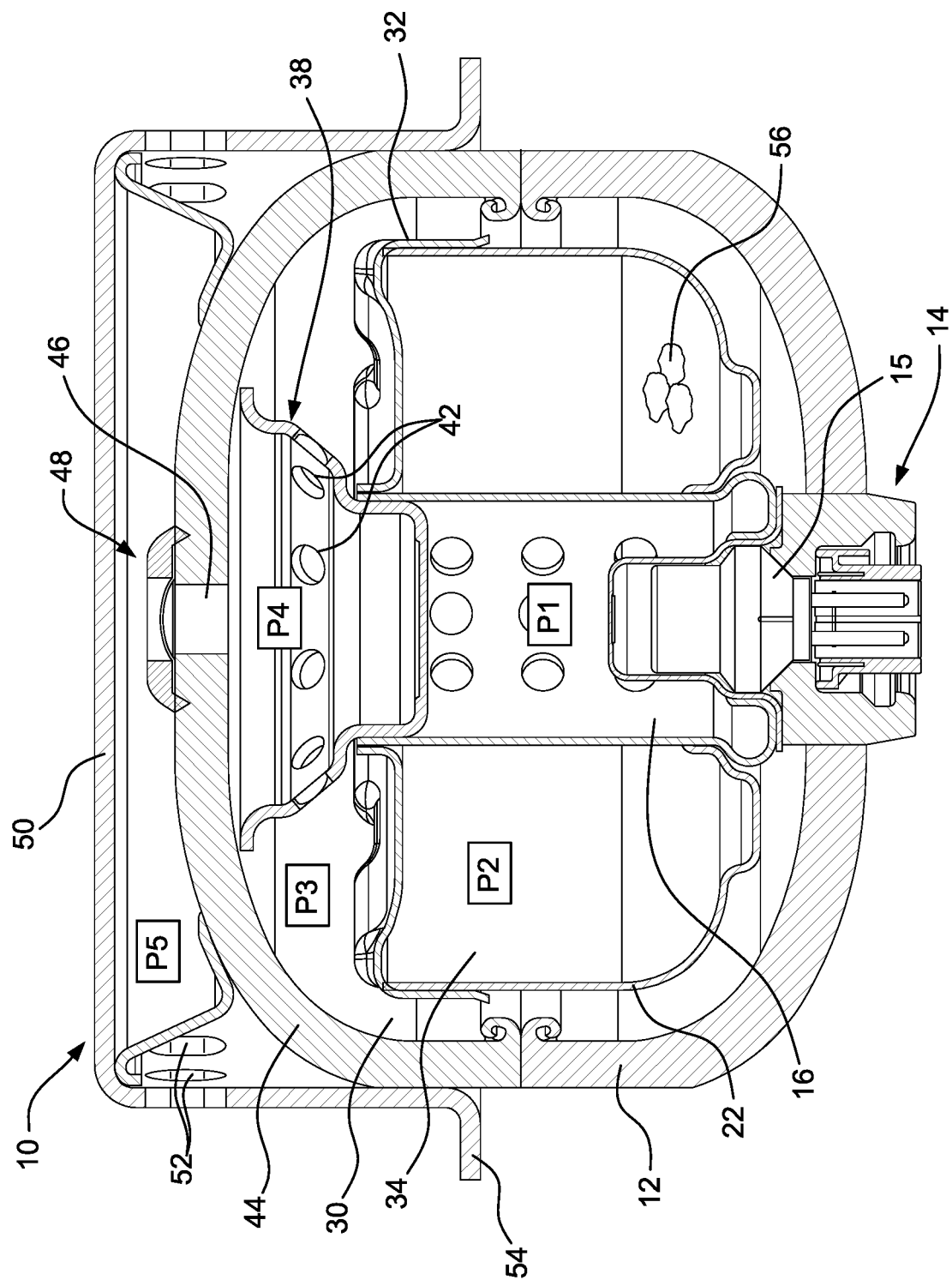
FIG. 9 is a cross-sectional view of the inflator showing various pressure zones.
Figure 10:
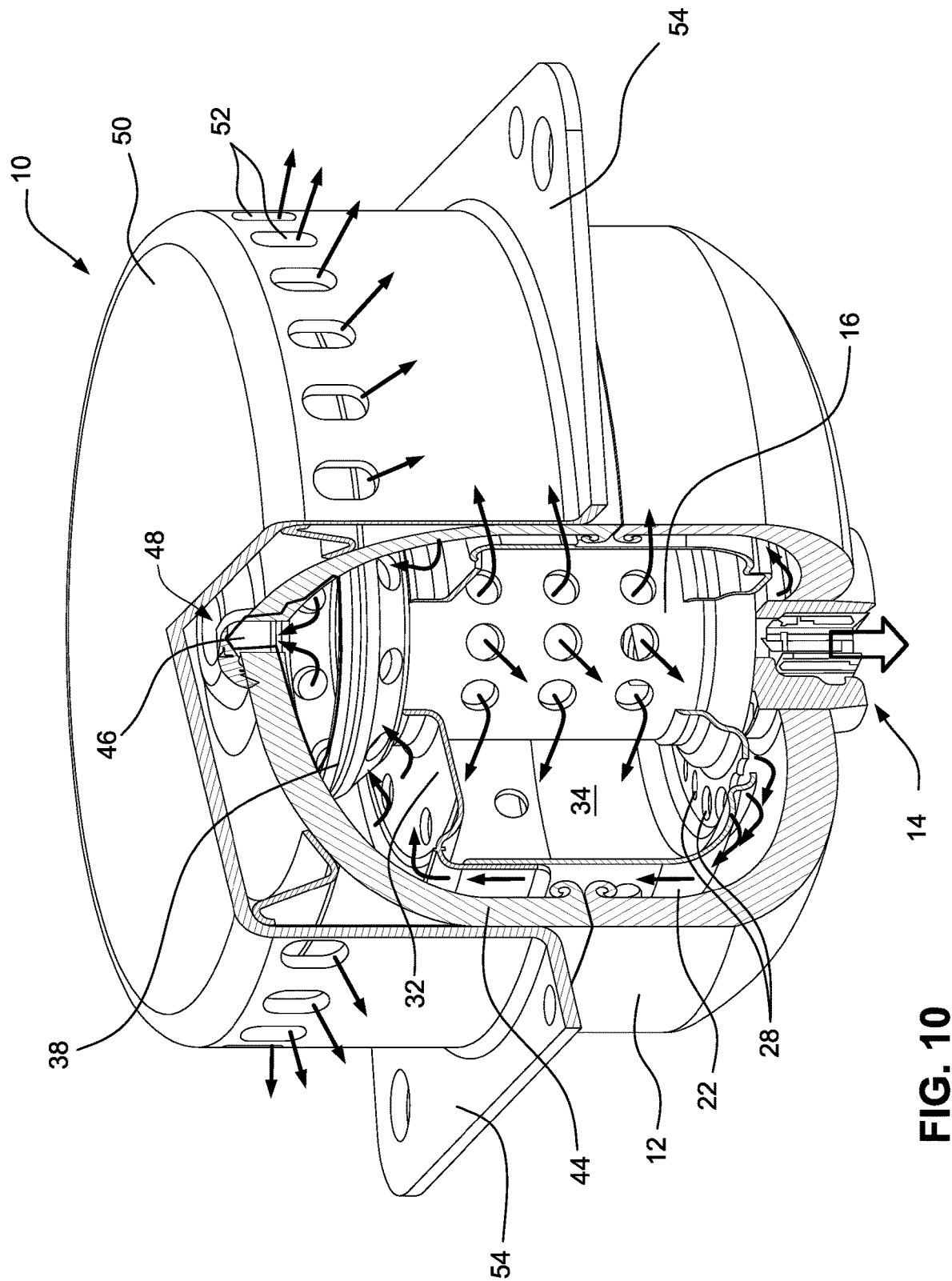
FIG. 10 is three-dimensional cutaway view showing combustion and stored gases flow through the inflator.

FIG. 10 is a three-dimensional cutaway view of the airbag inflator 10 according to the described embodiments. FIG. 9 is a cross-sectional view. With reference to FIGS. 1-8, the airbag inflator 10 includes a lower pressure vessel 12 supporting an initiator assembly 14, which may be hermetically sealed. The structure and operation of the initiator assembly 14 are known, and any suitable initiator assembly may be utilized. Details of the assembly 14 will thus not be further described.

A booster can 16 is centrally mounted in the lower pressure vessel 12 and secured to the initiator assembly 14. The booster can 16 is generally cylindrical and includes a central opening 18 that is sized to fit over the initiator assembly 14 in a friction fit. The booster can 16 is thus secured without a weld.

The booster can 16 includes directional vents 20 in the form of orifices or the like in one quadrant of the booster can 16. That is, the vents 20 are only provided in the section shown in the drawings, and the remainder of the booster can 16 is without the vents 20. By positioning the vents 20 only in one quadrant of the booster can 16, slower ignition of the main pyrotechnic material is achieved, thereby reducing the internal operating pressure of the inflator, which allows for thinner and lighter outer pressure vessels. The slow ignition also enables the main generant grain design to be simpler such that a tablet or single-center perforated cylindrical grain can be used as compared to a more complex grain design such as the clover grain or other multi-perforated grains used in some existing systems.

Figure 1:
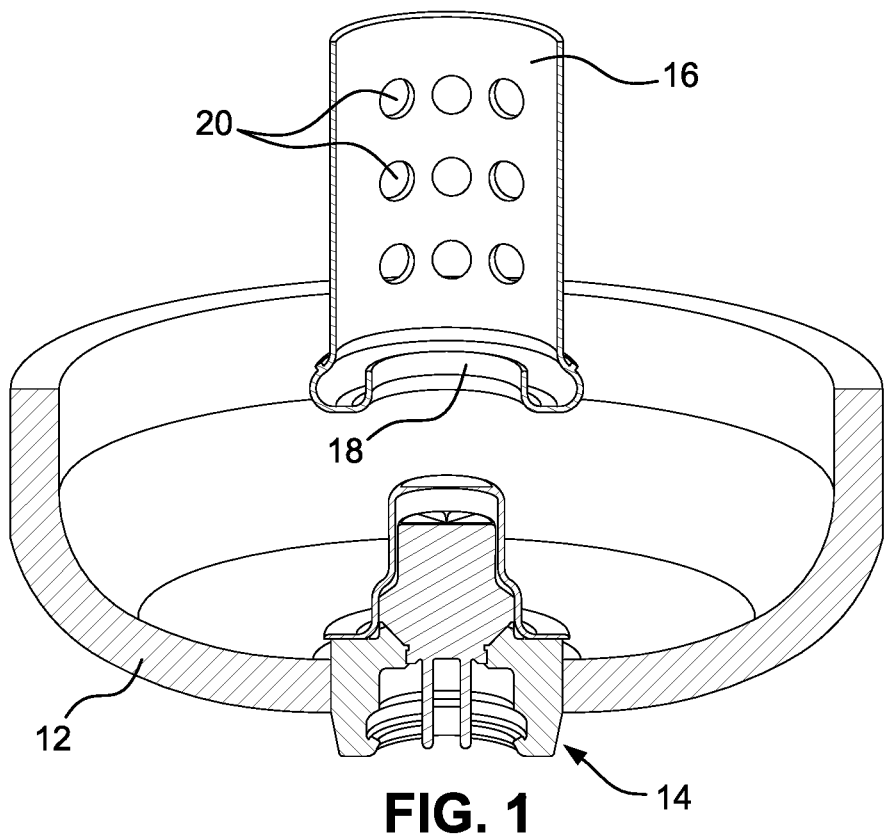
FIGS. 1 and 2 show the lower pressure vessel and installation of the booster can.
Figure 2:
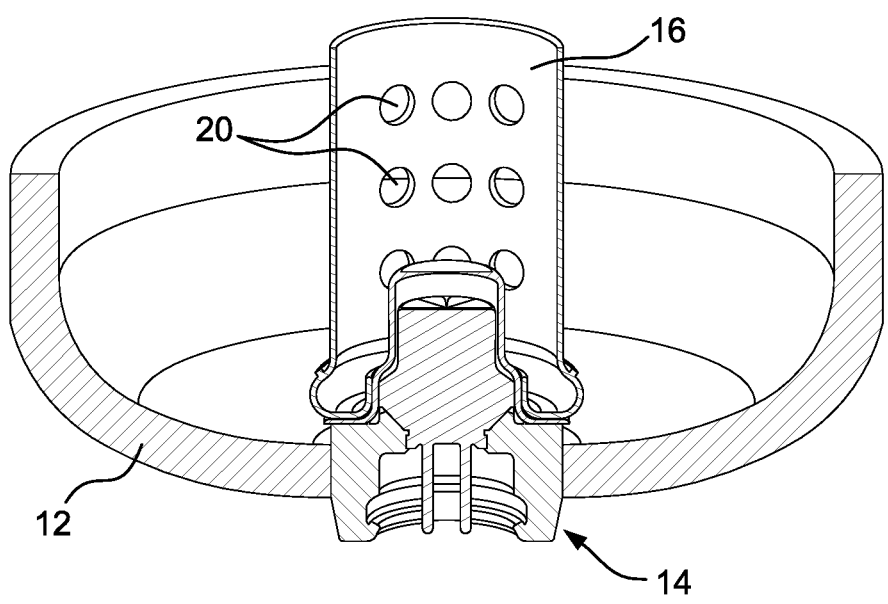
Figure 3:
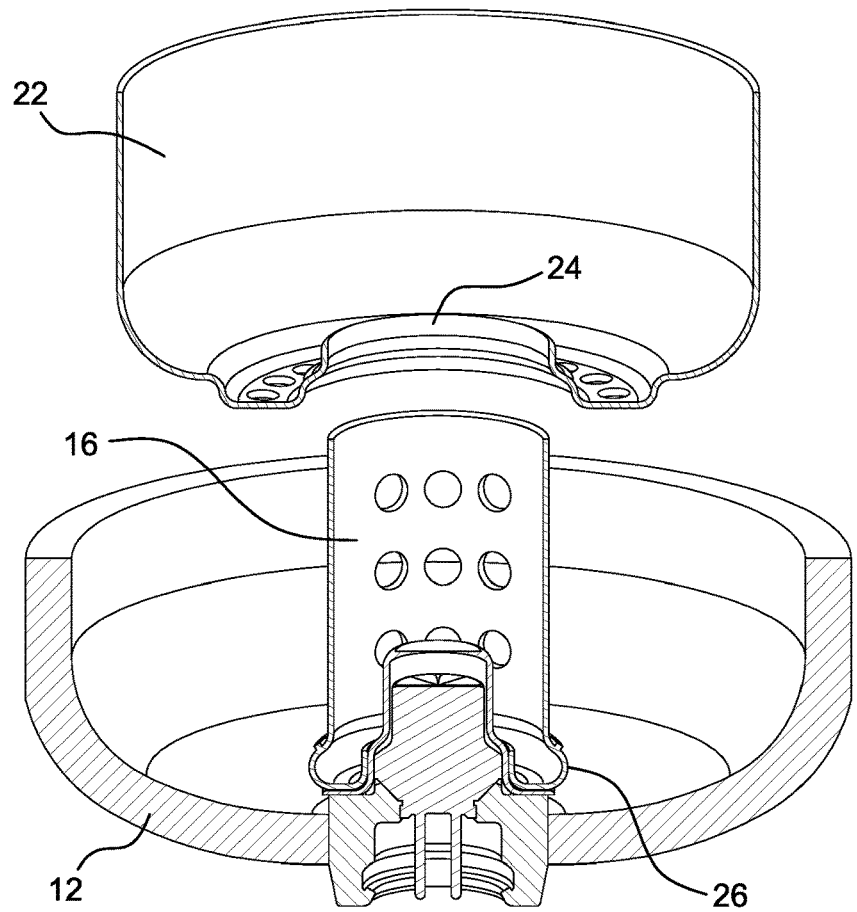
FIGS. 3 and 4 show installation of the energetics canister.
Figure 4:
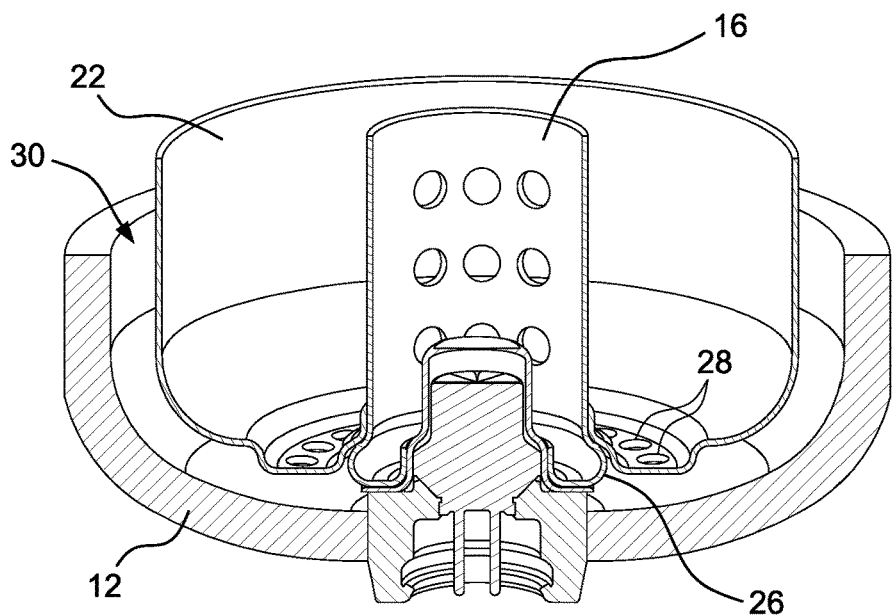

As shown in FIGS. 3 and 4, an energetics canister 22 is secured over the booster can 16 such that the energetics canister 22 is positioned radially between the lower pressure vessel 12 and the booster can 16. The energetics canister 22 includes a central opening 24 that is sized to fit over the booster can 16. The energetics canister 22 is positioned over the booster can 16 until the central opening 24 engages a circumferential ridge 26 at a bottom of the booster can 16.

In the installed position engaging the circumferential ridge 26, the energetics canister 22 is spaced from a floor of the lower pressure vessel 12. The energetics canister 22 includes outlet vent openings 28 in a bottom wall through which combustion and stored gases exit the energetics canister into a space 30 between the energetics canister 22 and the lower pressure vessel 12 (and upper pressure vessel 44 described below).

Figure 5:
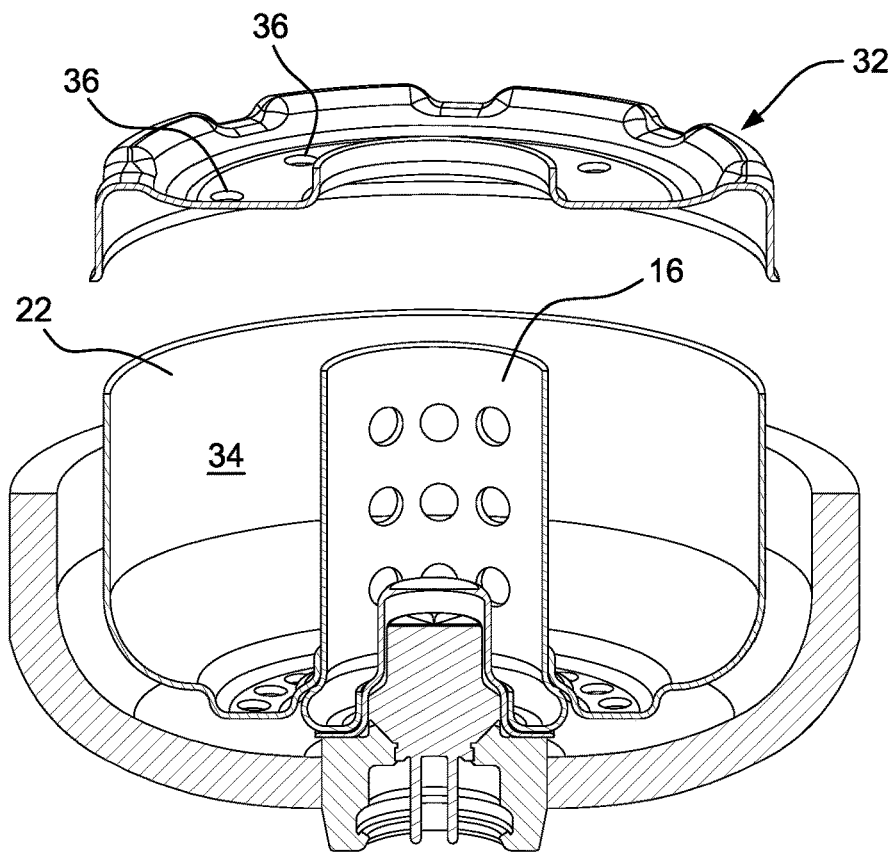
FIGS. 5 and 6 show installation of the energetics cover.
Figure 6:
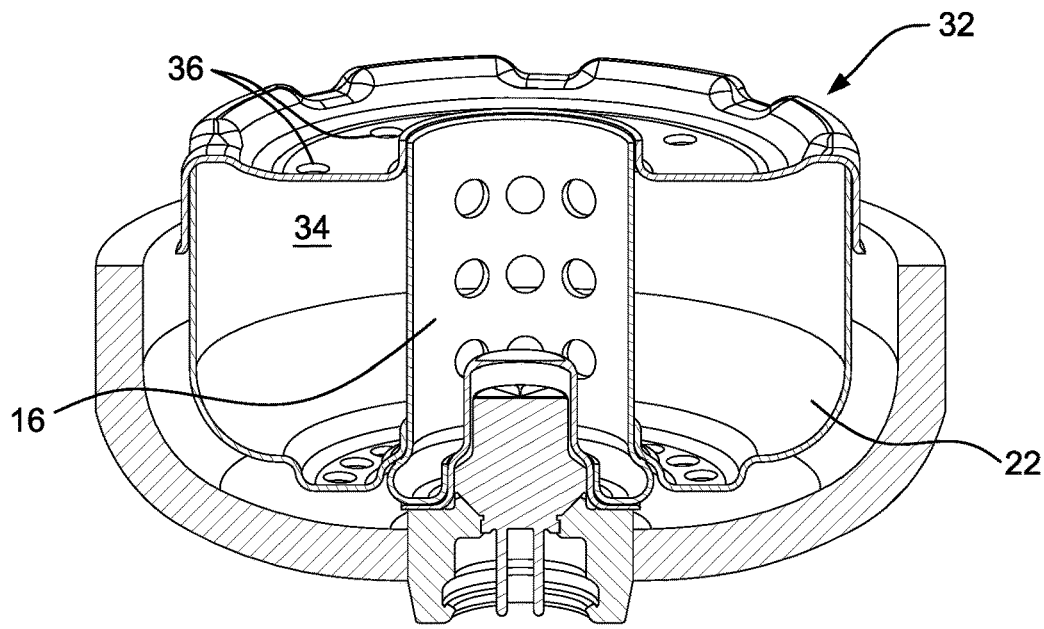

As shown in FIGS. 5 and 6, an energetics cover 32 encloses a circumferential space 34 between the booster can 16 and the energetics canister 22. The energetics cover 32 is provided with vent holes or openings 36. The energetics canister 22 is substantially cylindrical, and with the energetics canister 22 installed over the booster can 16, the circumferential space 34 is toroidal shaped.

Figure 7:
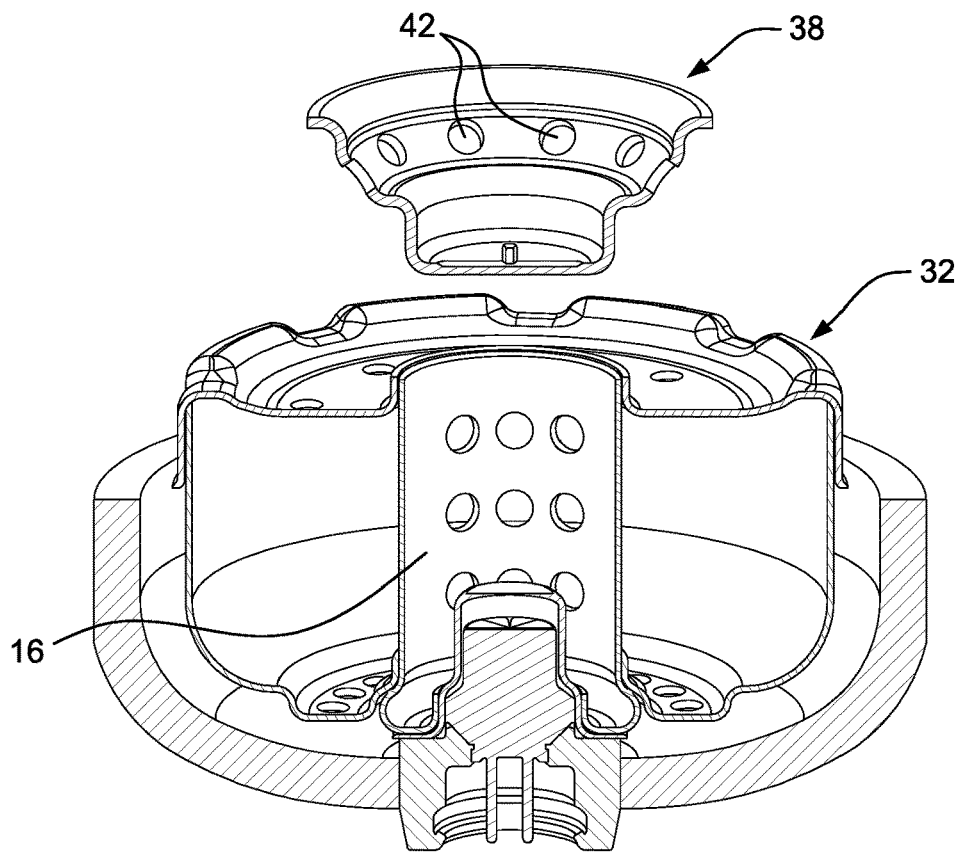
FIGS. 7 and 8 show installation of the flow diverter.
Figure 8:
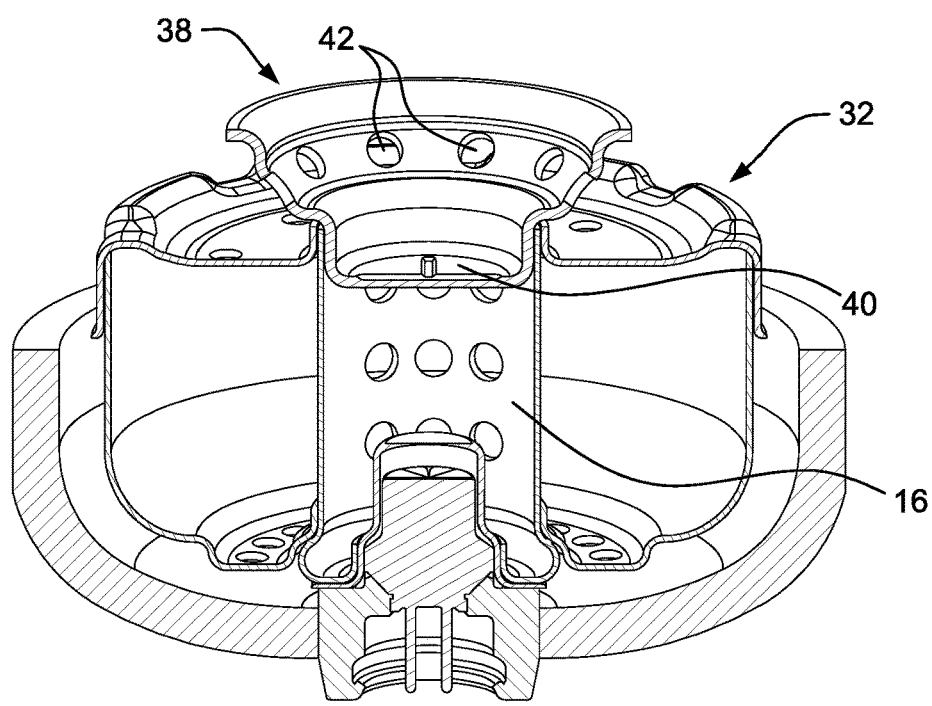

With reference to FIGS. 7 and 8, a flow diverter 38 including a closed bottom 40 is fit into the open end of the booster can 16 to close the booster can 16. The flow diverter 38 includes inlet vent openings 42 above/downstream of the energetics cover 32. As shown, the inlet vent openings 42 in the flow diverter 38 are positioned circumferentially around the flow diverter 38. The flow diverter 38 serves to close the top of the booster can 16, which forces combustion and stored gases to exit the booster can 16 radially. The flow diverter 38 also serves to retain the energetics cover 32 on the energetics canister 22.

With reference to FIGS. 9 and 10, an upper pressure vessel 44 is positioned over the flow diverter 38 engaging the lower pressure vessel 12. The upper pressure vessel 44 is welded to the lower pressure vessel 12, and together the lower 12 and upper 44 pressure vessels define an overall airbag inflator pressure vessel. The upper pressure vessel 44 includes an exit orifice 46 sealed with a rupturable membrane 48.

A manifold 50 is secured over the upper pressure vessel 44. The manifold 50 includes a plurality of vents 52 positioned circumferentially around the manifold 50. The manifold 50 also includes attachment flanges 54 or the like for securing the airbag inflator 10 in place. In use, pyrotechnic combustion gas and stored gas passing into the flow diverter 38 flow through the upper pressure vessel 44 via the exit orifice 46 into the manifold 50 and through the vents 52.

In some embodiments, the initiator assembly 14 is secured in the lower pressure vessel 12 such that the initiator 15 (see FIG. 9) detaches from the initiator assembly 14 upon an excessive increase in internal pressure without an inflator fragmentation event. The initiator assembly 14 is laser welded into the lower pressure vessel via an initiator support. The initiator 15 is placed onto the initiator support with an O-ring on its can, and then a stainless-steel sleeve/cap is placed over the O-ringed initiator and laser welded to the initiator sleeve creating a hermetic seal. Upon a deployment event where due to unexpected (not normal) increase in internal pressure, the initiator 15 is ejected from the inflator with the initiator sleeve being inverted allowing for gas to exit the inflator without any pressure vessel or other parts rupturing or fragmenting, thereby ensuring safe dynamic venting of the gas. The initiator sleeve and support remain within the structure.

The detachable initiator 15 serves as a pressure relief mechanism through the bottom portion of the lower pressure vessel 12 in the event of an elevated system internal pressure without any rupture of the inflator during a deployment event. During the in-process production, a regulatory test is required that verifies compliance to shipping regulations. The test is called a hydroburst test in which the structure is filled with a liquid such as hydraulic oil and taken at a lower pressurization rate than a live deployment. In this event, the inflator 10 experiences a compliant vent of the pressure in the lower pressure vessel 12 via detachment of the initiator assembly 14.

The airbag inflator 10 operates as a hybrid inflator releasing a mixture of stored and generant combustion gas to provide the desired module performance. The overall airbag inflator pressure vessel defined by the upper and lower pressure vessels 12, 44 is sealed to store an inert gas or gas mixture at a predefined pressure. A generant 56 is disposed in the energetics canister 22. In a deployment event, activation of the initiator 14 vents combustion and stored gases through the directional vents 20 in the booster can 16. The combustion gas ignites the generant 56 in the energetics canister 22, and the combustion gases along with the pre-existing pressurized gases in the overall airbag inflator pressure vessel defined by the pressure vessels 12, 44 flows through the inflator to inflate the airbag.

An noted above, the directional vents 20 in the booster can 16 direct the combustion and stored gases from the initiator 14 into only one quadrant of the energetics canister 22. This allows for a slower ignition of the generant 56, thereby reducing the internal operating pressure of the inflator 10.

With reference to FIG. 10, as the generant combusts, the circumferential space 34 in the energetics canister 22 effects a relatively higher operating pressure, which improves combustion efficiency and improves gaseous effluents, particularly fumes of carbon monoxide and NOx. The space 34 inside the energetics canister 22 may be defined as a first pressure zone. The combustion and stored gases exit the energetics canister 22 via the outlet vent openings 28 in the bottom wall and the vent holes 36 in the energetics cover 32. As a consequence of the positioning of the energetics canister 22 and the outlet vent openings 28 and vent holes 36, the circumferential space 30 between the energetics canister 22 and the pressure vessels 12, 44 functions as a second pressure zone at an operating pressure lower than the operating pressure of the first pressure zone (i.e., the operating pressure within the energetics canister 22). The high pressure in the first pressure zone provides for better combustion and improved gaseous effluents. The lower pressure in the second pressure zone provides for safer operation and activation of the inflator.

With continued reference to FIGS. 9 and 10, combustion and stored gases in the space 30 between the energetics canister 22 and the pressure vessels 12, 44 flow through the inlet vent openings 42 in the flow diverter 38, which subsequently direct the combustion and stored gases through the exit orifice 46. Ignition gas from the exit orifice 46 after breaking the rupturable membrane 48 flows through the vents 52 in the manifold 50 to inflate the airbag.

Figure 11:
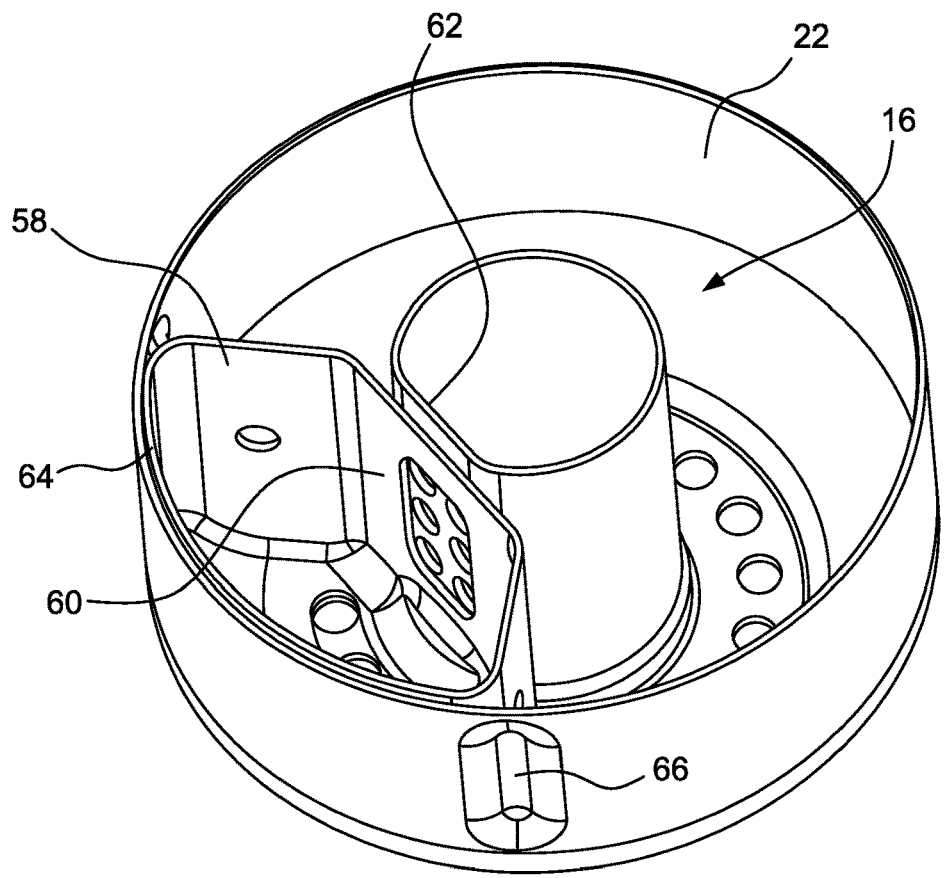
Figure 12:
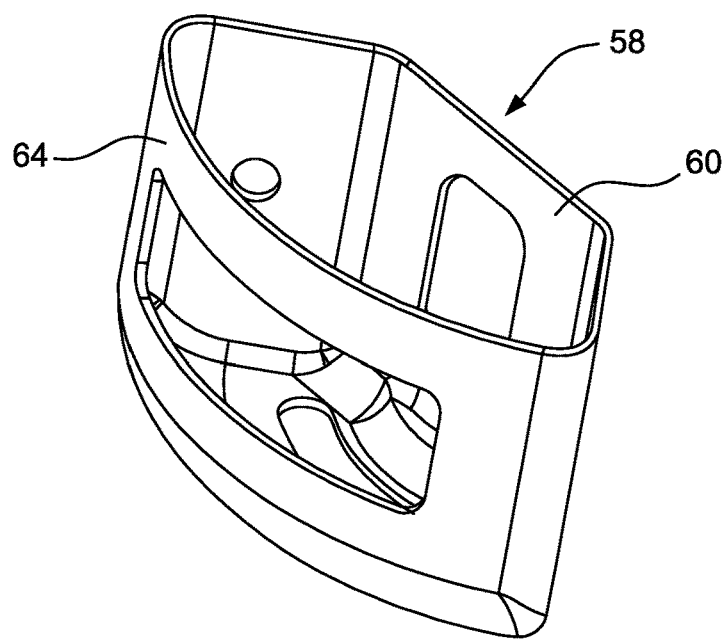

With reference to FIGS. 11-15, the energetics canister 22 may be provided with a smaller internal energetics canister 58 placed into it. In some embodiments, the smaller canister may be a kidney-shaped canister. In FIGS. 11 and 12, the internal energetics canister 58 has a flattened inner surface 60 that engages a corresponding flattened surface 62 on the vented side of the booster can 16. A radially outermost surface 64 of the internal energetics canister 58 is curved in complement with the shape of the main energetics canister 22. The main energetics canister 22 may be provided with indentations 66 that extend radially inward into the energetics canister 22 between which the internal energetics canister 58 is positioned. FIGS. 13-15 show a variation with a portion of the internal energetics canister 58 surrounding the booster can 16.

The directional flow from the booster can 16 would flow into the smaller canister, and the smaller canister through smaller communication vents between the smaller canister and the energetics canister 22 could further slow the ignition of the main generant. This added smaller canister could allow for further reduction in operating pressure, use of tablet designs in the inflator, and so-called S-shaped tank performance from the inflator.

With the airbag inflator of the described embodiments, the components are designed to allow the generant to operate at a higher internal pressure than the external volume between the outside of the canister/lid/flow diverter assembly, thereby increasing combustion efficiency leading to improved performance in terms of gaseous effluents and cushion/module performance. The inflator also advantageously includes a pressure relief in the event of an elevated system internal pressure without any rupture of the inflator. The described inflator also eliminates the requirement for simultaneous welds, which facilitates manufacturing and reduces potential weld particles.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An airbag inflator comprising:
a lower pressure vessel supporting an initiator assembly;
a booster can centrally mounted in the lower pressure vessel and secured to the initiator assembly, the booster can including a central opening;
an energetics canister secured over the booster can such that the energetics canister is positioned radially between the lower pressure vessel and the booster can;
an energetics cover enclosing a circumferential space between the booster can and the energetics canister;
a flow diverter including a closed bottom closing the central opening of the booster can and retaining the energetics cover on the energetics canister, the flow diverter including inlet vent openings downstream of the energetics cover;
an upper pressure vessel positioned over the flow diverter and engaging the lower pressure vessel, the upper pressure vessel including an exit orifice sealed with a rupturable membrane; and
a manifold secured over the upper pressure vessel.

2. The airbag inflator according to claim 1, wherein the booster can comprises directional vents such that combustion and stored gases from the booster can are not uniformly distributed into the energetics canister.

3. The airbag inflator according to claim 2, wherein the booster can is cylindrical, and wherein the directional vents comprise orifices in one quadrant of the booster can.

4. The airbag inflator according to claim 1, wherein the energetics canister is spaced from a floor of the lower pressure vessel, the energetics canister comprising outlet vent openings in a bottom wall through which combustion and stored gases exit the energetics canister into a space between the energetics canister and the lower pressure vessel.

5. The airbag inflator according to claim 4, wherein the flow diverter is disposed in a space between the energetics cover and the upper pressure vessel, wherein the combustion and stored gases exiting the energetics canister pass through the inlet vent openings of the flow diverter.

6. The airbag inflator according to claim 5, wherein the energetics cover comprises outlet vent openings through which the combustion and stored gases exit the energetics canister into a space between the energetics canister and the upper pressure vessel.

7. The airbag inflator according to claim 6, wherein the booster can is cylindrical, wherein the booster can comprises orifices in one quadrant of the booster can, and wherein the energetics cover outlet vent openings are not uniformly distributed such that there are no vent openings within the one quadrant of the booster can.

8. The airbag inflator according to claim 5, wherein the manifold comprises manifold vents, and wherein the combustion and stored gases passing into the flow diverter flow through the upper pressure vessel via the exit orifice into the manifold and through the manifold vents.

9. The airbag inflator according to claim 4, wherein the energetics canister comprises an internal energetics canister disposed inside the energetics canister, the internal energetics canister including outlet vent openings in walls separating the internal energetics canister and the energetics canister through which combustion and stored gases exit the internal energetics canister into the energetics canister.

10. The airbag inflator according to claim 1, further comprising a generant disposed in the energetics canister, wherein a relative position of the energetics canister effects a higher operating pressure in the circumferential space than an operating pressure in a space between the energetics canister and the upper and lower pressure vessels.

11. The airbag inflator according to claim 1, wherein an operating pressure in the circumferential space is greater than an operating pressure in a space between the energetics canister and the upper and lower pressure vessels.

12. The airbag inflator according to claim 1, wherein the inflator is filled with an Argon/Helium gas mixture under pressure.

13. The airbag inflator according to claim 1, wherein the energetics cover comprises vent holes.

14. The airbag inflator according to claim 1, wherein the booster can is cylindrical, and wherein the energetics canister is substantially cylindrical such that the circumferential space is toroidal shaped.

15. The airbag inflator according to claim 14, wherein the inlet vent openings in the flow diverter are positioned circumferentially around the flow diverter.

16. The airbag inflator according to claim 1, wherein the energetics canister comprises a main energetics canister positioned in the lower pressure vessel and an internal energetics canister positioned within the main energetics canister.

17. An airbag inflator comprising:
a lower pressure vessel supporting an initiator assembly;
a booster can centrally mounted in the lower pressure vessel and secured to the initiator assembly;

an energetics canister secured over the booster can such that the energetics canister is positioned radially between the lower pressure vessel and the booster can;
an energetics cover enclosing a circumferential space between the booster can and the energetics canister;
a flow diverter closing the booster can and retaining the energetics cover on the energetics canister, the flow diverter including inlet vent openings downstream of the energetics cover;
an upper pressure vessel positioned over the flow diverter and engaging the lower pressure vessel, the upper pressure vessel including an exit orifice sealed with a rupturable membrane; and
a manifold secured over the upper pressure vessel,
wherein the initiator assembly comprises an initiator, and wherein the initiator assembly is secured in the lower pressure vessel such that the initiator detaches from the initiator assembly upon an excessive increase in internal pressure such that the internal pressure is safely vented without an inflator fragmentation event.

18. An airbag inflator comprising:
a lower pressure vessel supporting an initiator assembly;
a booster can centrally mounted in the lower pressure vessel and secured to the initiator assembly;
an energetics canister secured over the booster can such that the energetics canister is positioned radially between the lower pressure vessel and the booster can;
an energetics cover enclosing a circumferential space between the booster can and the energetics canister;
a flow diverter closing the booster can and retaining the energetics cover on the energetics canister, the flow diverter including inlet vent openings downstream of the energetics cover;
an upper pressure vessel positioned over the flow diverter and engaging the lower pressure vessel, the upper pressure vessel including an exit orifice sealed with a rupturable membrane; and
a manifold secured over the upper pressure vessel,
wherein the upper pressure vessel is welded to the lower pressure vessel, and wherein the booster can is secured without a weld.

19. An airbag inflator comprising:
a lower pressure vessel supporting an initiator assembly;
an upper pressure vessel engaging the lower pressure vessel, the upper pressure vessel including an exit orifice sealed with a rupturable membrane;
an inert gas or gas mixture contained in the lower and upper pressure vessels;
a first pressure zone containing a generant, the first pressure zone comprising outlet vent openings through which combustion and stored gases exit;
a second pressure zone functioning at an operating pressure lower than an operating pressure of the first pressure zone, wherein combustion and stored gases from the first pressure zone flow through the outlet vent openings into the second pressure zone;
a flow diverter disposed in the second pressure zone and including inlet vent openings, wherein the flow diverter is configured to direct the combustion and stored gases through the exit orifice; and
a manifold secured over the upper pressure vessel, the manifold including manifold vents through which the combustion and stored gases from the exit orifice pass,
wherein the initiator assembly is detachably secured in the lower pressure vessel such that the initiator assembly detaches from the lower pressure vessel upon an increase in internal pressure without a deployment event.

20. An airbag inflator comprising:
a lower pressure vessel supporting an initiator assembly;
an upper pressure vessel engaging the lower pressure vessel, the upper pressure vessel including an exit orifice sealed with a rupturable membrane;
an inert gas or gas mixture contained in the lower and upper pressure vessels;
a first pressure zone containing a generant, the first pressure zone comprising outlet vent openings through which combustion and stored gases exit;
a second pressure zone radially outward of the first pressure zone and functioning at an operating pressure lower than an operating pressure of the first pressure zone, wherein combustion and stored gases from the first pressure zone flow through the outlet vent openings into the second pressure zone;
a flow diverter disposed in the second pressure zone and including inlet vent openings, wherein the flow diverter is configured to direct the combustion and stored gases through the exit orifice;
a manifold secured over the upper pressure vessel, the manifold including manifold vents through which the combustion and stored gases from the exit orifice pass; and
a booster can centrally mounted in the lower pressure vessel within the first pressure zone and secured to the initiator assembly, wherein the booster can comprises directional vents such that combustion and stored gases from the booster can are not uniformly distributed in the first pressure zone.

21. The airbag inflator according to claim 20, wherein the upper pressure vessel is welded to the lower pressure vessel, and wherein the booster can is secured without a weld.

22. An airbag inflator comprising:
a lower pressure vessel supporting a hermetically sealed initiator assembly;
an upper pressure vessel engaging the lower pressure vessel, the upper pressure vessel including an exit orifice sealed with a rupturable membrane;
an inert stored gas mixture at pressures at least fifty times greater than atmospheric pressure contained within the upper and lower pressure vessels;
a booster can with directional vents that confines outwards flow to an angular quadrant, the booster can centrally mounted in the lower pressure vessel and secured to the initiator assembly;
a main energetics canister secured over the booster can such that the main energetics canister is positioned radially between the lower pressure vessel and the booster can;
an internal energetics canister located inside the main energetics canister and positioned between the main energetics canister and the booster can, the internal energetics canister enclosing an angular region inside the main energetics canister;
an energetics cover enclosing a circumferential space between the booster can and the main energetics canister;
a flow diverter closing the booster can and including inlet vent openings downstream of the energetics cover; and
a manifold secured over the upper pressure vessel.

23. The airbag inflator according to claim 22, wherein the main energetics canister is spaced from a floor of the lower pressure vessel, the main energetics canister comprising outlet vent openings in a bottom wall through which combustion and stored gases exit the main energetics canister into a space between the main energetics canister and the lower pressure vessel.

24. The airbag inflator according to claim 23, wherein the internal energetics canister comprises outlet vent openings in a bottom wall through which combustion and stored gases exit the internal energetics canister into the space between the main energetics canister and the lower pressure vessel.

25. The airbag inflator according to claim 24, wherein the internal energetics canister has outlet vents in walls separating the internal and main energetics canisters through which combustion and stored gases exit the internal energetics canister into the main energetics canister.

26. The airbag inflator according to claim 24, wherein the flow diverter is disposed in a space between the main energetics canister and the upper pressure vessel, wherein the combustion and stored gases exiting the main energetics canister pass through the inlet vent openings of the flow diverter.

27. The airbag inflator according to claim 26, wherein the manifold comprises directional vents, and wherein the combustion and stored gases passing into the flow diverter flow through the upper pressure vessel via the exit orifice into the manifold and through the directional vents.

28. The airbag inflator according to claim 22, wherein the initiator assembly comprises an initiator, and wherein the initiator assembly is secured in the lower pressure vessel such that the initiator detaches from the initiator assembly upon an excessive increase in internal pressure, and the internal pressure is safely vented without an inflator fragmentation event.

* * * * *